United States Patent [19]

Meier

[11] 4,358,231
[45] Nov. 9, 1982

[54] DEVICE FOR INTERNALLY DEBURRING TUBES

[75] Inventor: Friedrich Meier, Remscheid, Fed. Rep. of Germany

[73] Assignee: Röchling-Burbach Weiterverarbeitung GmbH, Völklingen-Saar, Fed. Rep. of Germany

[21] Appl. No.: 192,191

[22] Filed: Sep. 30, 1980

[30] Foreign Application Priority Data

Oct. 9, 1979 [DE] Fed. Rep. of Germany ....... 2940874

[51] Int. Cl.³ .............................................. B23D 1/08
[52] U.S. Cl. ................................................... 409/299
[58] Field of Search ....................... 409/299; 90/24 B; 82/82

[56] References Cited

U.S. PATENT DOCUMENTS

| 2,237,550 | 4/1941 | Darner | 409/299 |
| 2,900,879 | 8/1959 | Norton et al. | 409/299 |
| 2,923,208 | 2/1960 | Hotchkiss et al. | 409/299 |
| 3,395,614 | 8/1968 | Dodson | 409/299 |

*Primary Examiner*—Leonidas Vlachos
*Attorney, Agent, or Firm*—Toren, McGeady & Stanger

[57] ABSTRACT

A device for internally deburring tubes and the like welded along a longitudinal seam includes an elongated main support body. A cutting ring is mounted in the main body adjacent to one of its ends and the ring projects outwardly from one surface on the body. Guide rollers are mounted in the main support body with two of the guide rollers spaced apart in the elongated direction of the body and projecting outwardly from the same surface as the cutting ring. Three additional rollers are located between the other two guide rollers and project outwardly from the surface of the main body opposite the one surface.

6 Claims, 6 Drawing Figures

DEVICE FOR INTERNALLY DEBURRING TUBES

SUMMARY OF THE INVENTION

The present invention is directed to a device for internally deburring tubes or tubular shaped sections which are welded along longitudinal seams, the device includes a cutting ring guided in the tube or tubular section by means of rollers.

Devices of this type are known, for example, see German Offenlegungsschrift No. 26 53 236. In such devices there is the disadvantage that the guidance of the tool shaft is insufficient for facilitating an optimum deburring in every respect, particularly if there is any great degree of unevenness involved. In a device known for some time, improved guidance was achieved by utilizing two oppositely arranged slide members each with two guide rollers.

Therefore, the primary object of the present invention is to provide a device which affords the best possible guidance of the cutting member.

In accordance with the present invention, the cutting ring is mounted in a support body with a first guide roller located adjacent the cutting ring and a second guide roller spaced from and in the same plane as the first guide roller. The cutting ring and the first and second guide rollers project from the same surface of the support body. A guide element is located within the support body and contains guide rollers which extend outwardly from the surface of the support body opposite the surface from which the cutting ring and other rollers project. To provide an even higher degree of safety for the deburring operation, in accordance with the present invention, the guide element is equipped with three guide rollers spaced apart from one another and disposed in a triangular arrangement in a plane extending through the axes of the rollers.

It is advantageous if the guide element is held in the main support body by a spring and a screw.

Another feature of the invention involves the placement of a connecting member between the guide element and the spring associated with it.

It is advantageous if the first guide roller is supported in a resilient adjustable holder.

By means of the present invention it is possible to operate the deburring device without any vibrations because of the exact guidance of the device, especially because the device is secured against rotation. Accordingly, good cutting conditions are achieved leading to a low degree of roughness in the cut surface and a long edge life for the cutting ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
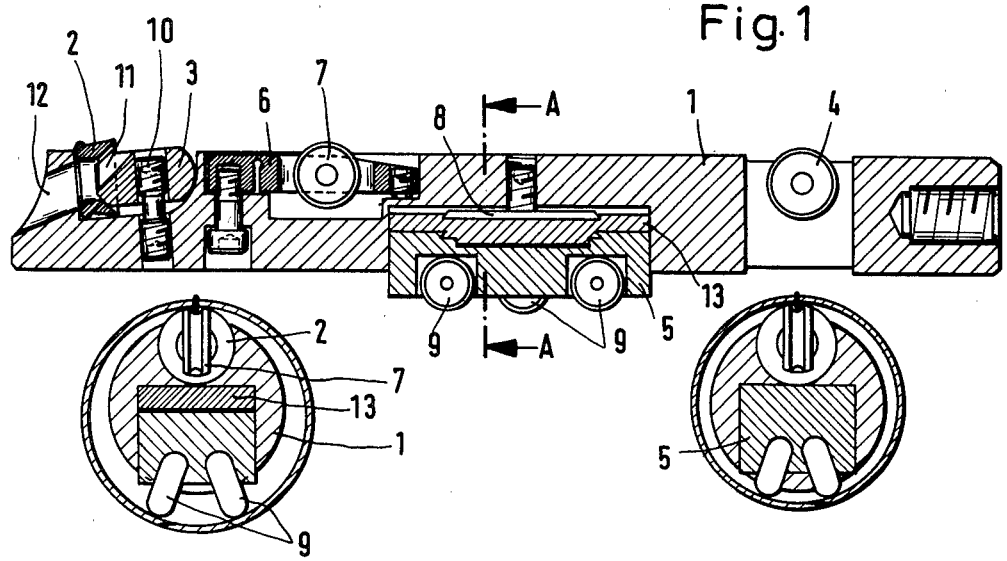
FIG. 1 is a longitudinal sectional view of a device embodying the present invention.
Figure 2:
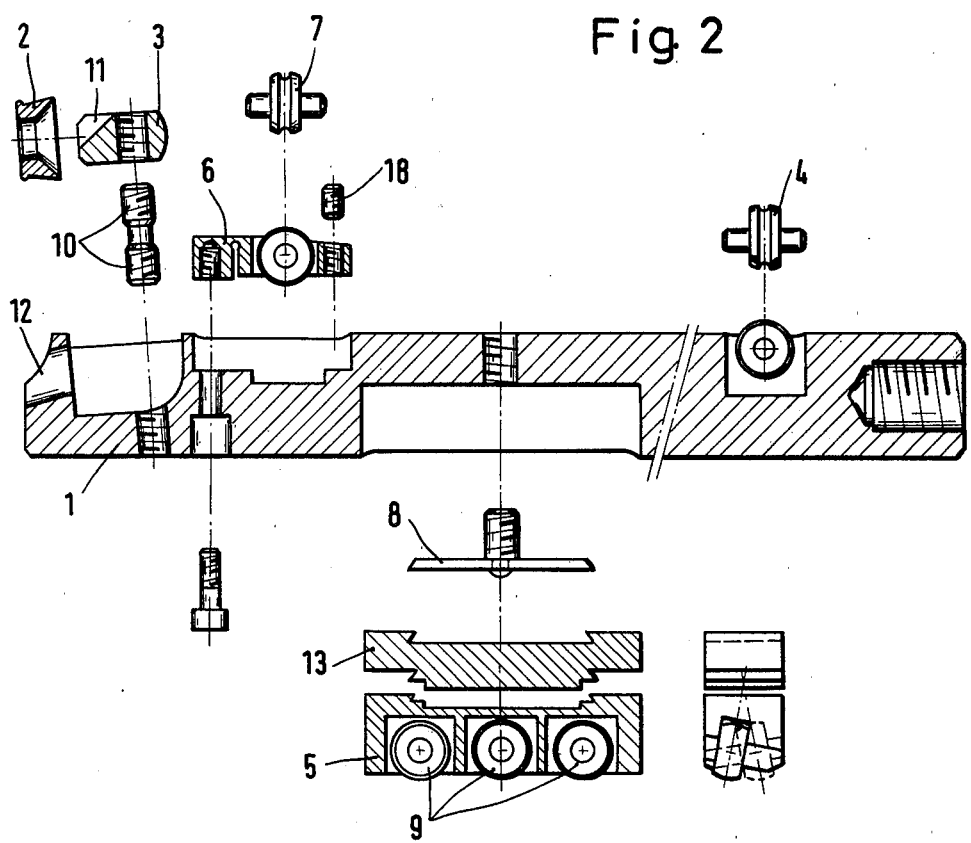
FIG. 2 is an exploded view of the device shown in FIG. 1.

In FIGS. 1 and 2 the device for deburring tubes or shaped tubular sections welded along longitudinal seams includes an elongated main support body 1 mounting a cutting ring 2 adjacent one end with the ring being fastened in place by a claw 3. Claw 3 is connected to the main support body 1 by a screw having a differential thread. With such a connection a simple loosening of the cutting ring can be effected for turning or replacing the ring.

Claw 3 has a forward upward portion 11 adjacent the cutting ring which acts as a chip guide for ensuring satisfactory removal of chips through a opening 12.

As can be seen in FIG. 1, the device is guided in a tube to be deburred by a three-point support arrangement. The support arrangement includes a first guide roller 7 located immediately adjacent the cutting ring and separated from the adjacent end of the support body 1 by the cutting ring. A second guide roller 4 is spaced in the elongated direction of the support body 1 from the first guide roller. The first and second guide rollers project outwardly from the same surface of the support body 1 as does the cutting ring 2. Projecting from the opposite surface of the main body is a guide element 5. Guide element 5 is secured in the main body by means of a spring member 8. In addition, first guide roller 7 is support resiliently in a segment 6 with a portion of the segment having a reduced cross section at one location. Such a construction of the segment 6 makes it possible to adjust exactly the cutting depth by means of a screw 18. The first guide roller 7 has the function of a copying roller.

Figure 3:
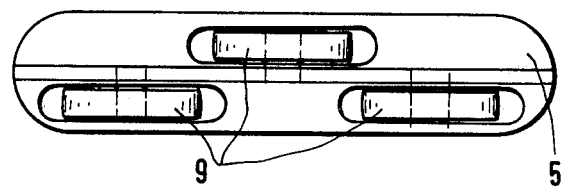
FIG. 3 is a bottom view, on an enlarged scale, of a guide element shown in FIGS. 1 and 2.
Figure 4:
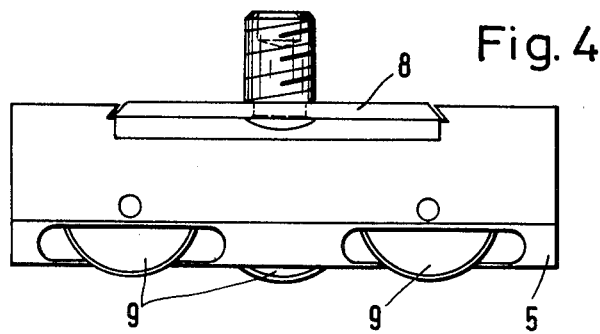
FIG. 4 is a side view of the guide element shown in FIG. 3.

A high degree of safety against rotation within the tube to be deburred is provided by the three rollers 9 positioned in the guide element 5 because these rollers are arranged in a triangle, note particularly FIG. 3. When viewed in a plane extending through the axes of the three third rollers 9, the triangular arrangement is apparent.

Depending on the diameter of the tube to be deburred, guide element 5 is fastened on the spring member 8 with or without a connecting member 13. This fastening arrangement facilitates adjustment to different tube diameters.

Figure 5:
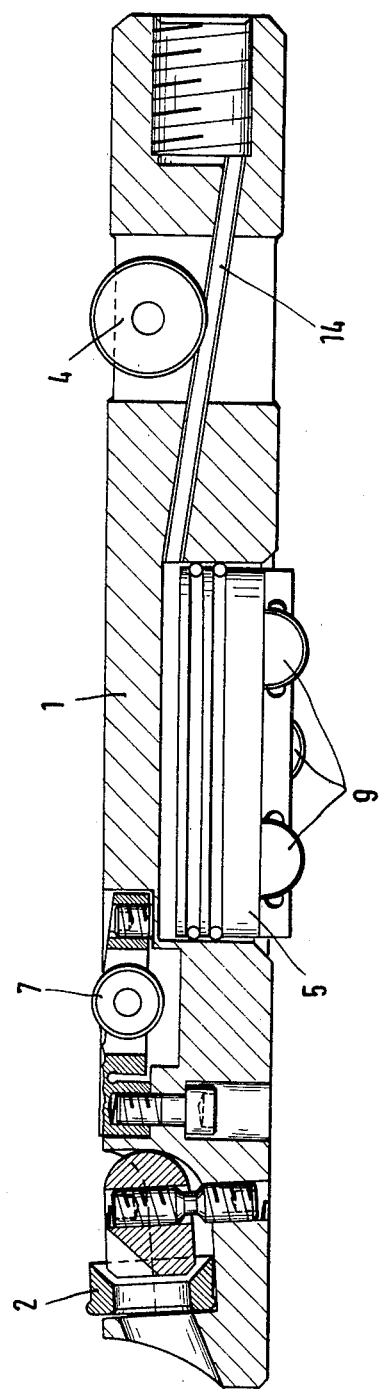
FIG. 5 is a longitudinal sectional view through a device embodying the present invention utilizing a hydraulic spring.
Figure 6:
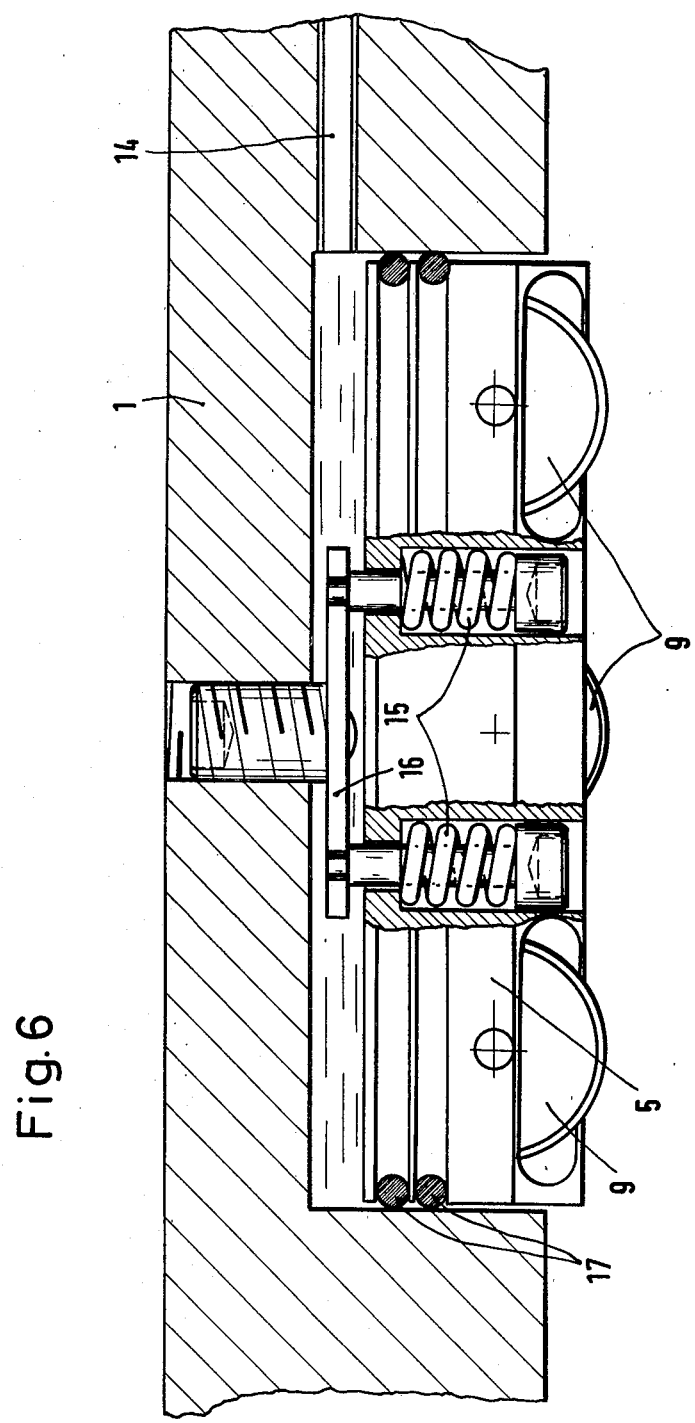
FIG. 6 is an enlarged sectional view of a portion of the device shown in FIG. 5.

The guide element 5 is relatively wide and long with the relatively large surface projecting into the main support body being well suited for a hydraulic spring known per se. An embodiment incorporating such an arrangement is illustrated in FIGS. 5 and 6. In this embodiment, it is possible to operate at a low pressure so that the cooling agent present can also be used as the hydraulic liquid. Accordingly, there is the advantage that no oil is used in the hydraulic system and it is recommended for use in various tubes wherein oil residues are avoided which might be harmful in view of the intended use for the tubes.

Guide element 5 can be quickly removed so that, depending on the intended use, a mechanical spring 8 or a hydraulic spring can be utilized.

As shown in FIG. 5 the cooling agent can be supplied through the line 14. FIG. 6 shows details of the hydraulic spring supported guide element 5. The rollers 9 in the guide element 5 are connected to the main support body 1 by return springs 15 and a plate 16. Sealing rings 17 are shown around the upper part of the guide element 5.

Spring 8 or the hydraulic spring presses the cutting ring against the upper wall of the tube for compensating for any changes in the tube diameter. Moreover, the resiliently constructed segment 6 supporting the first roller 7 absorbs impacts originating along the welded seam making it possible to deburr with low vibrations. Such an operation results in a smooth cutting surface and a long edge life for the cutting ring 2.

While specific embodiments of the invention have been shown and described in detail to illustrate the application of the inventive principles, it will be understood that the invention may be embodied otherwise without departing from such principles.

What is claimed:

1. Device for internally deburring tubes or shaped tubular sections which are welded along longitudinal seams, comprising a support body having a first end and a second end spaced apart in the cutting direction, said support body having a first surface arranged to face the longitudinal seam and an oppositely facing second surface with said first and second surfaces extending in the direction between said first and second ends, a cutting ring mounted in said support body and projecting outwardly from said first surface, a first guide roller mounted in said support body and located adjacent said cutting ring, said first roller projecting outwardly from said first surface, a second guide roller mounted in said support body and spaced from said first guide roller in the direction between said first and second ends and being more remote from said cutting ring, said second guide roller extending outwardly from said first surface, said first and second rollers being aligned in the first end-second end direction, a one-piece guide element resiliently mounted in said support body, and three third guide rollers mounted in said guide element and projecting outwardly from said second surface, with said third guide rollers being spaced apart in a triangular arrangement in a plane extending through the axes of said third guide rollers.

2. Device, as set forth in claim 1, wherein said cutting ring being located adjacent the first end of said support body with said cutting ring located between the first end and said first guide roller.

3. Device, as set forth in claim 1, including a spring positioned between said guide element and said support body.

4. Device, as set forth in claim 3, wherein said support body having a recess in the second surface thereof located between said first guide roller and said second guide roller, said guide element being positioned within said recess with said third guide rollers being located between said first and second guide rollers.

5. Device, as set forth in claim 4, wherein a connecting member being arranged between said guide element and said spring within the recess in said support body.

6. Device, as set forth in claim 1, comprising a resilient adjustable segment mounted in the first surface of said support body and supporting said first guide roller.

* * * * *